May 8, 1962  F. G. WEIGHART  3,033,029
AMPLIFIER GAIN COMPENSATOR FOR VARIABLE
ULTRASONIC SIGNAL RESPONSE
Filed Jan. 14, 1958  3 Sheets-Sheet 1

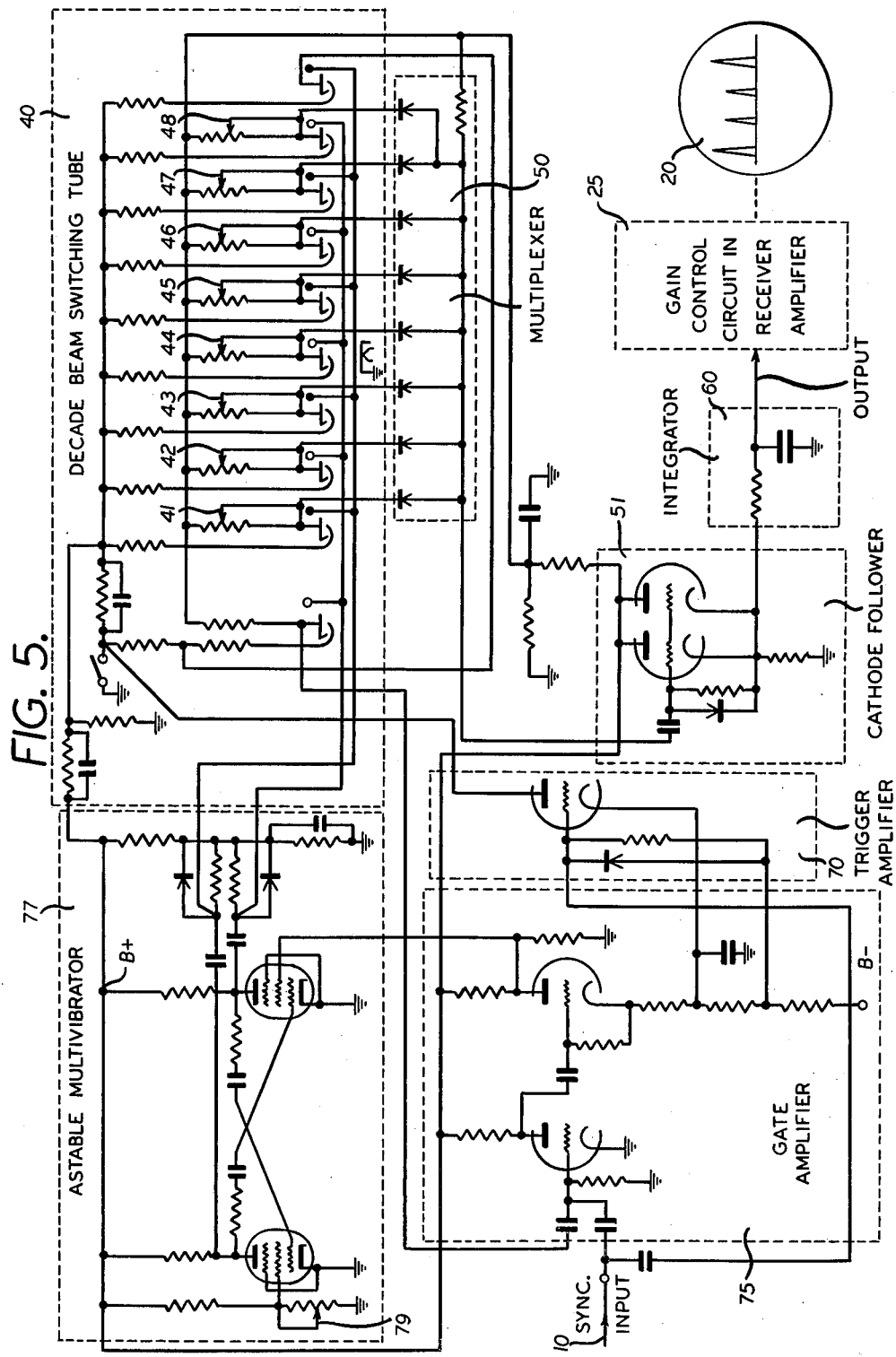

United States Patent Office 3,033,029
Patented May 8, 1962

3,033,029
AMPLIFIER GAIN COMPENSATOR FOR VARIABLE ULTRASONIC SIGNAL RESPONSE
Fred G. Weighart, New Fairfield, Conn., assignor to Sperry Products, Inc., Danbury, Conn., a corporation of New York
Filed Jan. 14, 1958, Ser. No. 708,804
4 Claims. (Cl. 73—67.8)

This invention relates to the inspection of material by ultrasonic vibrations. The method now employed consists in generating periodically high frequency electric pulses and applying them to a piezoelectric element which transforms the electric vibrations into mechanical vibrations which are then transmitted into the object under test. The pulses are reflected from the rear boundary of the object as well as from any intermediate surfaces such as internal defects. The presence of such defects can therefore be determined by indicating the reception of the pulse reflections by the piezoelectric element which transforms the mechanical vibrations into electric voltage signals.

The magnitude of such signals received from defects would be in general a function of the size of the defects were it not for the fact that a second factor enters in determining such magnitudes. The second factor is the distance of the defect below the entering surface of the object and only if such second factor is eliminated would the magnitude of the returned pulses be a true function of the size of the defects.

It is therefore the principal object of this invention to provide a means whereby the above mentioned second effect, i.e., the variation in the magnitude of response due to distance of the defect below the entering surface, is eliminated.

Further objects and advantages of this invention will become apparent in the following detailed description thereof.

In the accompanying drawings,

FIG. 5 shows the detailed electric wiring of certain of the elements of FIG. 4.

Figure 4:
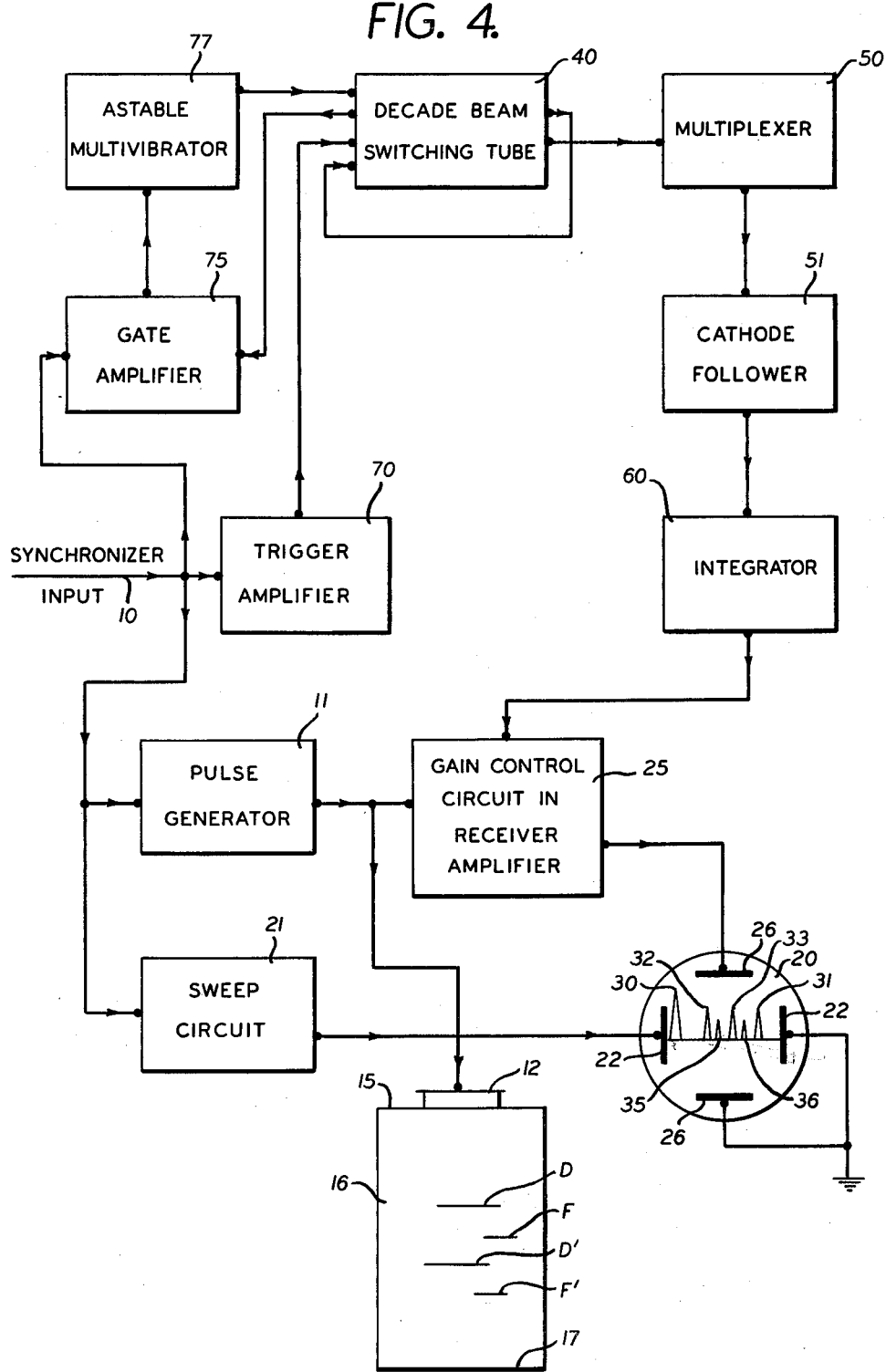
FIG. 4 is a block diagram showing the complete assembly of the elements of this invention.

Referring first to FIG. 4 there are shown the elements of a standard ultrasonic inspection system utilizing the pulse technique of the ultrasonic reflectoscope. By said method a synchronizer indicated at 10 is caused to trip a pulse generator 11 periodically to apply high frequency pulses to a piezoelectric element which may be a quartz crystal 12 in effective engagement with the entering surface 15 of a test piece 16 which is to be inspected for internal defects. The piezoelectric element translates the electric impulses into mechanical vibrations which then travel as a beam into the test piece and will be reflected from reflecting surfaces such as the rear surface 17 and an internal defect such as lamination D. The reflected mechanical pulses are received by the transducer 12 which translates them into electric voltages which may be used to actuate any suitable indicator such as a cathode ray tube 20. A sweep circuit 21 may be energized by synchronizer 10 at the same time that the pulse generator 11 is energized to generate simultaneously a sweep between horizontal plates 22 of the cathode ray tube. The voltages applied to crystal 12 may be amplified by amplifier 25 and applied to the vertical plates 26 of the cathode ray tube to deflect the horizontal sweep. Thus the horizontal sweep will be deflected first by the generated pulse as indicated at 30, by the reflection from the rear surface 17 as indicated at 31 and by reflections from intermediate reflecting surfaces such as defects D and D' as indicated at 32 and 33.

The problem which here presents itself arises from the fact, as stated in the introduction hereto that the returned energy from a given defect would be a function of the size of the defect were it not for the fact that this energy varies also as a function of the distance of the defect below the entering surface 15 of the test piece. Thus referring to FIG. 1 there is shown the graph of received voltage signal relative to distance within the test piece of the same defect of given size. Here it will be seen that not only does the quantity of returned energy vary with distance within the test piece, but it varies non-linearly as a complex function of distance (or time). It will be noted that the curve in FIG. 1 indicates reduced response at short distances. This is due to the near-field effect, which is commonly known in optical work, and applies to wave motion in general. Simply stated, this is caused by the cancelling effect of out-of-phase ultrasonic energy from divergent components of the beam combining with the normal component of the beam. Some of the ultrasonic energy that strikes the defect takes an essentialy normal path relative to the face of transducer 12. Such energy may be called the in-phase component of the beam. Some of the energy also takes other divergent paths which are longer and therefore energy that strikes the defect will be out-of-phase. The closer the defect to the entrant surface 15, the more divergent energy will be present and thus the cancelling effect will be greater. As distance increases, the effect decreases. Beyond a distance from the entrant surface 15 which may be referred to as the near-field limit, attenuation in the test piece 16 is predominant and signal amplitude decreases with distance. The problem which this invention seeks to solve is the elimination of this distance variable, so that variations in the amount of returned energy will be a function only of size of defect, i.e., such indications as 32 and 33 will by their amplitudes give a direct reading of size of defect.

Figure 1:
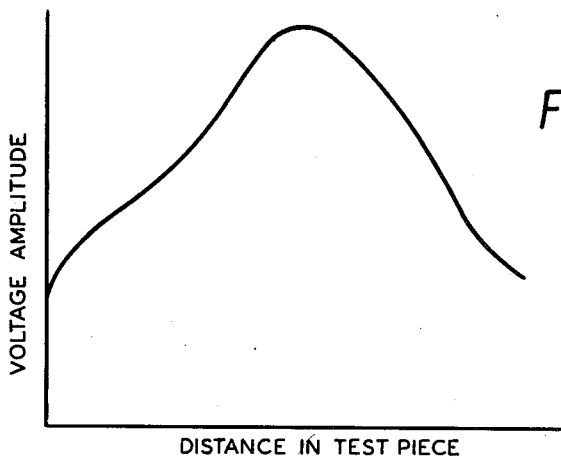
FIG. 1 is a graph of the energy received from a reflection of a pulse by a defect of given size at varying distances within the test piece.

Applicant's method for solving the aforementioned problem consists in the following steps:

(1) Determining for any given test piece the characteristic curve of voltage amplitude returned from a given size of defect throughout the distance traveled by the generated pulse. Such a curve for example is shown in FIG. 1 for the test piece 16.

(2) Generating a segmented curve of voltage substantially similar to the characteristic curve of the test piece.

(3) Integrating the characteristic segmented curve.

(4) Applying the integrated curve to a gain control circuit which will amplify the voltage signal at a ratio which increases with diminution of signal voltage in response to a defect of given size throughout the traveled distance of the pulse.

By the above method it will be seen that the voltage output variations which are a function of distance are thus eliminated, and only the voltage variations due to size of defect will remain. Thus a defect D' of given size will yield an indication 33 of substantially the same amplitude as the indication 32 due to a defect D of the same size as defect D'. A defect F' of smaller size than D, D' will yield an indication 36 of substantially the same amplitude as indication 35 due to a defect F of the same size as defect F'. But the defects F, F' being smaller than the defects D, D', the amplitudes of indications 35, 36 will be smaller than the amplitudes of indications 32, 33 since the gain control operates on two initially different input signals.

Figure 2:
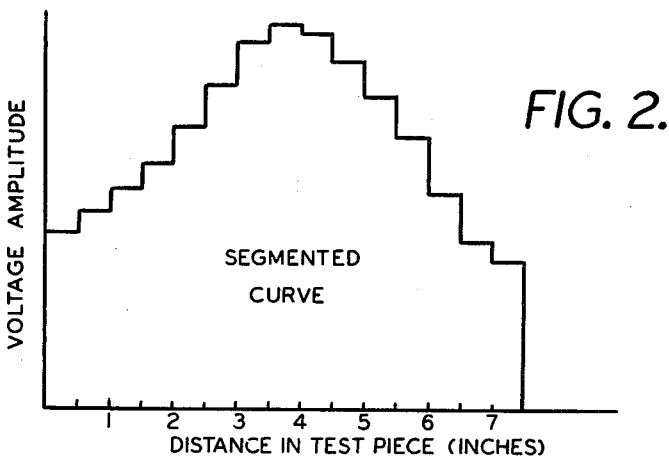
FIG. 2 is a graph of a generated segmented curve of voltages against time.
Figure 3:
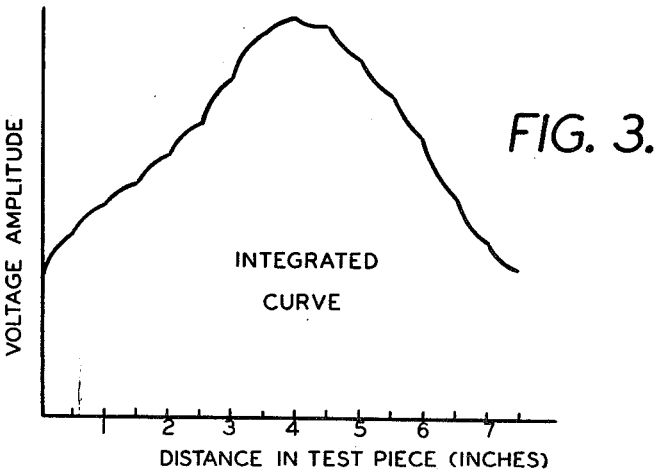
FIG. 3 is a view of the segmented curve of FIG. 2 after being integrated.

For obtaining a segmented voltage output curve corresponding to the curve of FIG. 1 there may be employed a decade beam switching tube 40 (FIG. 4) having ten switching positions each of which, with the exception of the first and last switching positions, has an adjustable voltage output from potentiometers 41—48. The switching positions are successively energized to yield outputs which may be made to correspond to the voltage outputs of FIG. 1 by means of adjustable potentiometers. The successive voltage outputs are passed through a multiplexer 50 to yield the segmented voltage curve of FIG. 2. The output of the multiplexer is integrated by integrator 60 after passing through cathode follower 51 to avoid capacity loading, and there is thus obtained the voltage curve of FIG. 3 which is closely similar to the curve of FIG. 1. The integrated curve of voltages is fed into the gain control circuit in the receiver amplifier 25 whose output is applied to the vertical plates 26 of the cathode ray tube 20 to deflect the horizontal sweep.

For energizing the decade beam tube the synchronizer 10 may be utilized. The synchronizing signal or trigger is passed into the trigger amplifier 70 which amplifies and inverts the signal. The trigger is used to clear and set to zero the decade beam switching tube so that a test cycle can be started. The trigger is also applied to the beam switch grid through the gate amplifier 75 and astable multivibrator 77 (FIG. 5) to switch the beam to the second target. This in turn initiates the gate on the first target and keeps the multivibrator in running condition. The multivibrator may be adjusted by potentiometer 79 to produce switching signals corresponding to any given units of distance in the test object, e.g. every half inch. When the beam reaches its last position on the tube the target voltage switches the beam to the first position. This terminates the gate and nothing further happens until the next cycle begins.

Any number of beam switching tubes may be cascaded to provide any number of points on the voltage curve to give any desired degree of correction and accuracy.

Having described my invention, what I claim and desire to secure by Letters Patent is:

1. A device for the ultrasonic inspection of objects, comprising means for generating high frequency electrical pulses, means for transforming the electric pulses into ultrasonic pulses, means for transmitting the ultrasonic pulses into the object and for receiving reflections of the pulses, means for transforming the received reflected ultrasonic pulses into output voltage signals, the output voltage signals varying as a function of the size of defect and for a given size defect also varying as a predetermined complex function of the distance of the defect below the entering surface of the object, means for amplifying the output voltage signals including a gain control circuit, means operable synchronously with the transmitted pulses for generating a voltage having an amplitude varying with time corresponding to said complex function of output voltage versus distance below the entering surface of the object, and means for applying said last-named voltage to said gain control circuit for varying the gain of said amplifying means to produce a substantially constant output of signal voltage for a given size defect throughout the distance traversed by said ultrasonic pulses in the object.

2. A device for ultrasonic inspection of objects comprising means for generating high frequency electrical pulses, means for transforming the electrical pulses into ultrasonic pulses for transmission into the object and for transforming received reflected ultrasonic pulses into output signals, a signal translating circuit including an input circuit supplied with said output signals, an output circuit and a control circuit for controlling the amplitude of signals developed at said output circuit, indicator means coupled to said output circuit, and means coupled to said control circuit for deriving and applying to said control circuit a control signal having an amplitude varying with time during each of repetitive intervals synchronized with said electrical pulses in accordance with a predetermined complex function including at least two, discrete time-portions of different character.

3. A device for ultrasonic inspection of objects comprising means for generating high frequency electrical pulses, means for transforming the electrical pulses into ultrasonic pulses for transmission into the object and for transforming received reflected ultrasonic pulses into output voltage signals, a signal translating circuit including an input circuit supplied with said output signals, an output circuit and a control circuit for controlling the amplitude of signals developed at said output circuit, indicator means coupled to said output circuit, and means coupled to said control circuit for deriving and applying to said control circuit a control signal having an amplitude varying with time during each of repetitive intervals synchronized with said electrical pulses in accordance with a predetermined complex function including at least two, discrete time-portions, one of said portions having a slope of one polarity and another of said portions having a slope of opposite polarity.

4. A device for ultrasonic inspection of objects comprising means for generating high frequency electrical pulses, means for transforming the electrical pulses into ultrasonic pulses for transmission into the object and for transforming received reflected ultrasonic pulses into output voltage signals, a signal translating circuit including an input circuit supplied with said output signals, an output circuit and a control circuit for controlling the amplitude of signals developed at said output circuit, indicator means coupled to said output circuit, and means coupled to said control circuit for deriving and applying to said control circuit a control signal having an amplitude varying with time during each of repetitive intervals synchronized with said electrical pulses in accordance with a predetermined complex function including at least two, discrete time-portions one of said portions having increasing values and another of said portions having decreasing values, said function also including a portion of extreme value.

References Cited in the file of this patent

UNITED STATES PATENTS

| | | |
|---|---|---|
| 2,461,543 | Gunn | Feb. 15, 1949 |
| 2,549,076 | Gallagher et al. | Apr. 17, 1951 |
| 2,803,129 | Bradfield | Aug. 20, 1957 |